(12) United States Patent
Margulis

(10) Patent No.: US 6,263,503 B1
(45) Date of Patent: Jul. 17, 2001

(54) METHOD FOR EFFECTIVELY IMPLEMENTING A WIRELESS TELEVISION SYSTEM

(76) Inventor: Neal Margulis, 660 Manzanita Way, Woodside, CA (US) 94062

( * ) Notice: Subject to any disclaimer, the term of this patent is extended or adjusted under 35 U.S.C. 154(b) by 0 days.

(21) Appl. No.: 09/318,904

(22) Filed: May 26, 1999

(51) Int. Cl.[7] ..................................................... H04N 7/16
(52) U.S. Cl. .............................................. 725/81; 725/82
(58) Field of Search .......................... 345/327; 348/734, 348/8, 9, 10, 11, 12, 13; 455/6.2, 6.3, 5.1, 6.1, 3.1, 4.1, 4.2, 277.1, 277.2; 725/80, 81, 82, 78, 91, 93, 114, 116, 117

(56) References Cited

U.S. PATENT DOCUMENTS

| | | | |
|---|---|---|---|
| 5,161,021 | * 11/1992 | Tsai | 358/188 |
| 5,682,195 | * 10/1997 | Hendricks et al. | 348/6 |
| 5,708,961 | 1/1998 | Hylton et al. | 455/4.2 |
| 5,710,605 | * 1/1998 | Nelson | 348/734 |
| 5,757,416 | * 5/1998 | Birch et al. | 348/6 |
| 5,794,116 | * 8/1998 | Matsuda et al. | 348/12 |
| 5,831,664 | * 11/1998 | Wharton et al. | 348/13 |
| 5,880,721 | * 3/1999 | Yen | 348/8 |
| 6,002,450 | * 12/1999 | Darbee et al. | 348/734 |
| 6,008,777 | * 12/1999 | Yiu | 348/734 |
| 6,040,829 | * 3/2000 | Croy et al. | 348/13 |
| 6,104,334 | * 8/2000 | Allport | 348/734 |

OTHER PUBLICATIONS

Wireless Local Area Networks: Issues in Technology and Standards; Jan. 6, 1999; pp. 1–13.

Bluetooth–News; Main Future User Models Document Verification & Qualification: Bluetooth Technical Background; Apr. 21, 1999; pp. 1 of 7 and 2 of 7; http://www.bluetooth.com/v2/news/show.asp.

Matsushita Electric Corporation of America; MicroCast™: Wireless PC Multimedia Transceiver System.

Microsoft Corporation; harman/kardon; Master Your Universe; 1999.

* cited by examiner

Primary Examiner—Chris Grant
(74) Attorney, Agent, or Firm—Gregory J. Koerner; Simon & Koerner LLP

(57) ABSTRACT

A method for effectively implementing a wireless television system comprises a wireless base station that processes and combines various program sources to produce a processed stream. A transmitter then responsively transmits the processed stream as a broadcast output stream to various portable wireless display devices for flexible viewing at variable remote locations.

38 Claims, 9 Drawing Sheets

METHOD FOR EFFECTIVELY IMPLEMENTING A WIRELESS TELEVISION SYSTEM

BACKGROUND OF THE INVENTION

1. Field of the Invention

The present invention relates generally to enhanced television systems, and relates more particularly to a method for effectively implementing a wireless television system.

2. Description of the Background Art

Developing an effective method for implementing enhanced television systems is a significant consideration for contemporary television designers and manufacturers. In conventional television systems, a display device may be utilized to view program information received from a program source. The conventional display device is typically positioned in a stationary location because of restrictions imposed by various physical connections that electrically couple the display device to input devices, output devices, and operating power. Other considerations such as display size and display weight may also significantly restrict viewer mobility in traditional television systems.

Portable television displays may advantageously provide viewers with additional flexibility when choosing an appropriate viewing location. For example, in a home environment, a portable television may readily be relocated to view programming at various remote locations throughout the home. A user may thus flexibly view television programming, even while performing other tasks in locations that are remote from a stationary display device.

However, portable television systems typically possess certain detrimental operational characteristics that diminish their effectiveness for use in modern television systems. For example, in order to eliminate restrictive physical connections, portable televisions typically receive television signals that are propagated from a remote terrestrial television transmitter to an antenna that is integral with the portable television. Because of the size and positioning constraints associated with a portable antenna, such portable televisions typically exhibit relatively poor reception characteristics, and the subsequent display of the transmitted television signals is therefore often of inadequate quality.

Other factors and considerations are also relevant to effectively implementing an enhanced wireless television system. For example, the evolution of digital data network technology and wireless digital broadcasting techniques may provide additional flexibility and increased quality to portable television systems. However, current wireless data networks typically are not optimized for flexible transmission and reception of video information.

Furthermore, a significant proliferation in the number of potential program sources (both analog and digital) may benefit a system user by providing an abundance of program material for selective viewing. In particular, an economical wireless television system for flexible home use may enable television viewers to significantly improve their television-viewing experience by facilitating portability while simultaneously providing an increased number of program source selections.

However, because of the substantially increased system complexity, such an enhanced wireless television system may require additional resources for effectively managing the control and interaction of various system components and functionalities. Therefore, for all the foregoing reasons, developing an effective method for implementing enhanced television systems remains a significant consideration for designers and manufacturers of contemporary television systems.

SUMMARY OF THE INVENTION

In accordance with the present invention, a method is disclosed for effectively implementing a wireless television system. In one embodiment of the present invention, initially, a wireless television system provides one or more program sources to a wireless base station that preferably differentiates the various types of program sources depending on whether the program source includes any combination of digital A/V data, analog video, or analog audio information.

If the program source includes digital A/V data, then, the wireless base station preferably formats the digital A/V data into an appropriate format, and provides the formatted data to a subsystem processor in the wireless base station. The subsystem processor responsively processes the formatted data to generate processed data (for example, by transcoding).

Similarly, if the program source includes analog video, then, the wireless base station preferably formats the analog video into an appropriate format, and provides the formatted video to the subsystem processor. The subsystem processor then responsively processes the formatted video to generate processed video.

In addition, if the program source includes analog audio, then, the wireless base station preferably formats the analog audio into an appropriate format, and provides the formatted audio to the subsystem processor. The subsystem processor then responsively processes the formatted audio to generate processed audio.

Next, the subsystem processor preferably combines the processed audio, video, and data into a processed stream. A communications processor then receives the processed stream, and responsively performs a wireless network processing procedure to generate a transmitter-ready stream. Finally, a transmitter device receives and modulates the transmitter-ready stream, and advantageously performs a wireless network transmission process to propagate a broadcast stream to a remote TV, a remote controller, an auxiliary base station, or any other compatible display receiver device, in accordance with the present invention.

The remote TV (or any other compatible display receiver device) preferably receives the broadcast stream from the wireless base station. A RF subsystem in the remote TV then preferably performs a wireless network processing procedure to generate a baseband stream. The foregoing wireless network processing procedure may include various appropriate techniques, such as demodulation and down-conversion of the broadcast stream propagated from the wireless base station.

An A/V decoder then preferably receives and demultiplexes the baseband stream into separate components which may include separate data, video, and audio information. If the baseband stream includes data information, then, the A/V decoder preferably manipulates the data information into an appropriate format to thereby generate manipulated data. Similarly, if the baseband stream includes video information, then the A/V decoder preferably decompresses the video information to generate decompressed video. In addition, if the baseband stream includes audio information, then the A/V decoder preferably decompresses the audio information to generate decompressed audio. The A/V decoder may then preferably provide the decompressed audio to an amplifier and speakers which operate to aurally reproduce the decompressed audio.

Concurrently, a display controller preferably may access the manipulated data and the decompressed video, and responsively perform a graphical user interface (GUI) processing procedure to generate display data and display video for presentation on the remote TV. Finally, the display controller provides the display data and the display video to the remote TV for remote viewing by a user of the wireless television system.

Therefore, the present invention effectively implements a flexible wireless television system that utilizes various heterogeneous components to facilitate optimal system interoperability and functionality. The present invention thus effectively and efficiently implements an enhanced wireless television system.

DETAILED DESCRIPTION OF THE PREFERRED EMBODIMENT

The present invention relates to an improvement in television systems. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

The present invention includes a method for effectively implementing a wireless television system, and includes a wireless base station that processes and combines various program sources to produce a processed stream. A transmitter module then responsively transmits the processed stream as a broadcast stream to various portable wireless display devices for flexible viewing at variable remote locations.

Figure 1:
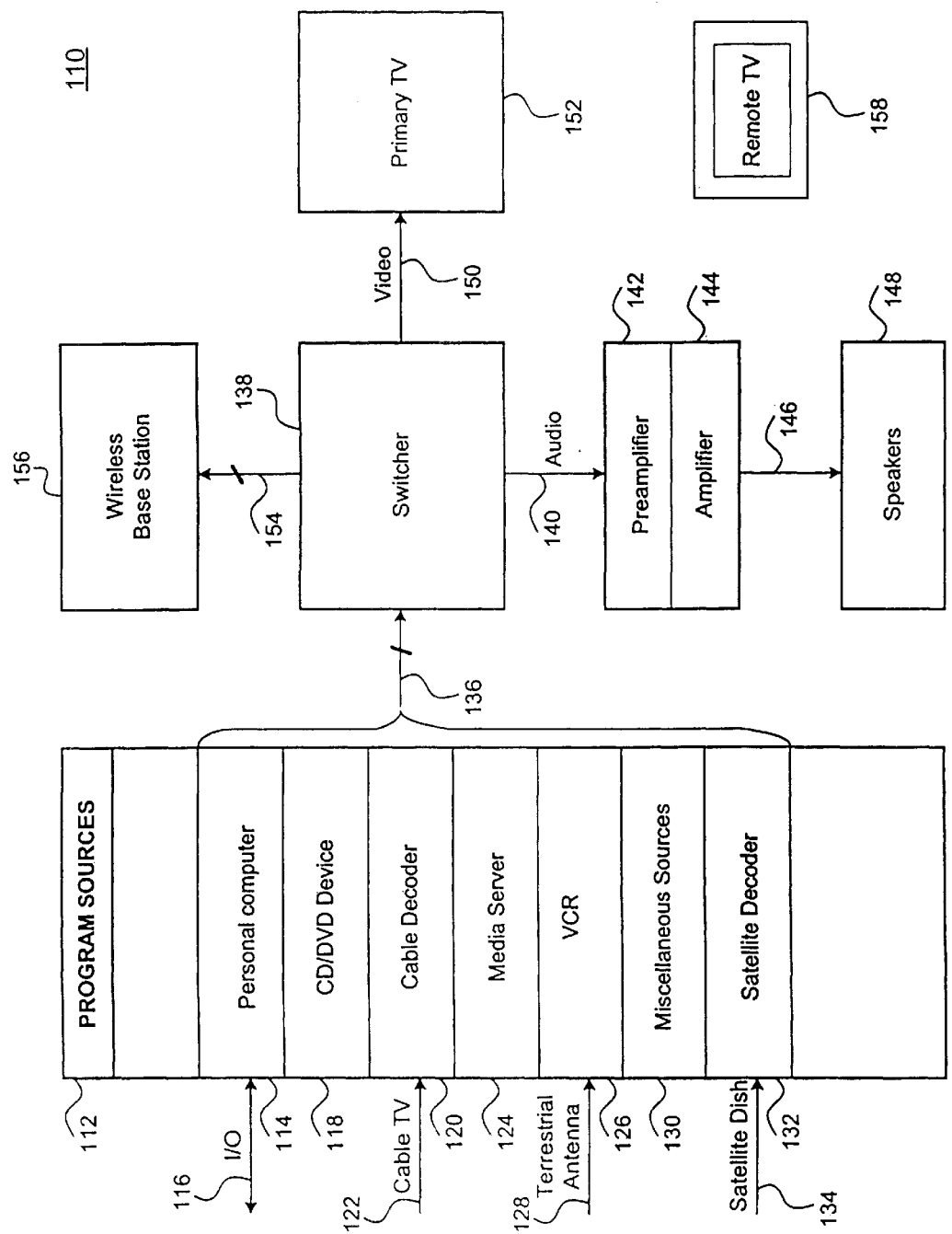
FIG. 1 is a block diagram of a basic wireless television system, in accordance with one embodiment of the present invention.

Referring now to FIG. 1, a block diagram of a basic wireless television system 110 is shown, in accordance with one embodiment of the present invention. In the FIG. 1 embodiment, wireless television system 110 preferably includes, but is not limited to, a number of programs sources 112, a switcher 138, a wireless base station 156, a primary television (TV) 152, a remote television (TV) 158, a preamplifier 142, an amplifier 144, and speakers 148. In other embodiments of the present invention, wireless television system 110 may readily include other components that are different from, or in addition to, those described in conjunction with the FIG. 1 embodiment.

In the FIG. 1 embodiment, wireless television system 110 is preferably configured for economical and efficient use in a home environment, however, in alternate embodiments, the present invention may be implemented for use in any appropriate environment. In the FIG. 1 embodiment, program sources 112 preferably comprise a selectable variety of consumer electronics devices that may include, but are not limited to, a personal computer 114 that communicates with other devices through input/output (I/O) path 116, a compact disk/digital video disk device (CD/DVD device) 118, a cable decoder 120 that receives a cable TV signal on path 122, a media server 124 that stores and provides various types of selectable programming, a video cassette recorder (VCR) 126 that receives a terrestrial antenna signal on path 128, miscellaneous is sources 130 that may include any desired type of program sources, and a satellite decoder 132 that receives a satellite dish signal on path 134.

In alternate embodiments of the present invention, program sources 112 may readily be configured to include any other types of program sources or devices that are different from, or in addition to, those described in conjunction with the FIG. 1 embodiment. For example, program sources 112 may provide any type of information, including video, audio, or data sources, that may be formatted in any compatible or appropriate format. Furthermore, program sources 112 may readily be implemented to include information for use in environments other than economical consumer home applications. For example, wireless television system 110 may readily be configured to include program sources 112 that are intended for various other uses, including industrial, governmental, or scientific applications.

The present invention also supports various types of supplemental data transmissions that may be implemented as a separate program source 112, or may alternately be incorporated into another program source 112. For example, relevant program guide information and/or video channel guide information may be provided as a program source 112, or may be incorporated into another program source 112. Such program guide information may be provided in any suitable manner, including from a television broadcast vertical-blanking interval (VBI) signal, from MPEG system data, or from the Internet through a wide-area network (WAN) connection.

In the FIG. 1 embodiment, switcher 138 preferably receives individual program signals from each of the program sources 112 via path 136. Switcher 138 then preferably selects one or more of the program sources 112 as a switcher output program in response to control information typically provided by a viewer of system 110. Switcher 138 preferably provides video information from the switcher output program to primary TV 152 via path 150. Similarly, switcher 138 preferably provides audio information from the switcher output program to amplifier 144 through preamplifier 142 via path 140. Amplifier 144 then provides the amplified audio information to speakers 148 via path 146.

In accordance with the present invention, switcher 138 preferably also provides one or more program sources 112 to wireless base station 156 through path 154. In the FIG. 1 embodiment, wireless base station 156 is implemented as a discrete component in system 110. However, in alternate embodiments, wireless base station 156 may readily be implemented as part of a set-top box (not shown) or any other component in system 110. In addition, wireless base station 156 may readily receive program sources 112 using one or more different routings than that discussed in conjunction with the FIG. 1 embodiment. For example, wireless base station 156 may be implemented as part of primary TV 152 and then receive program sources 112 from a picture-in-picture (PIP) tuner corresponding to primary TV 152.

In accordance with the present invention, wireless base station 156 then advantageously processes the received program source(s) 112, and wirelessly transmits the processed program source(s) 112 as a broadcast stream to remote TV 158 for flexible remote viewing by a system user. The implementation and functionality of wireless base station 156 and remote TV 158 are further discussed below in conjunction with FIGS. 2 through 9.

Figure 2:
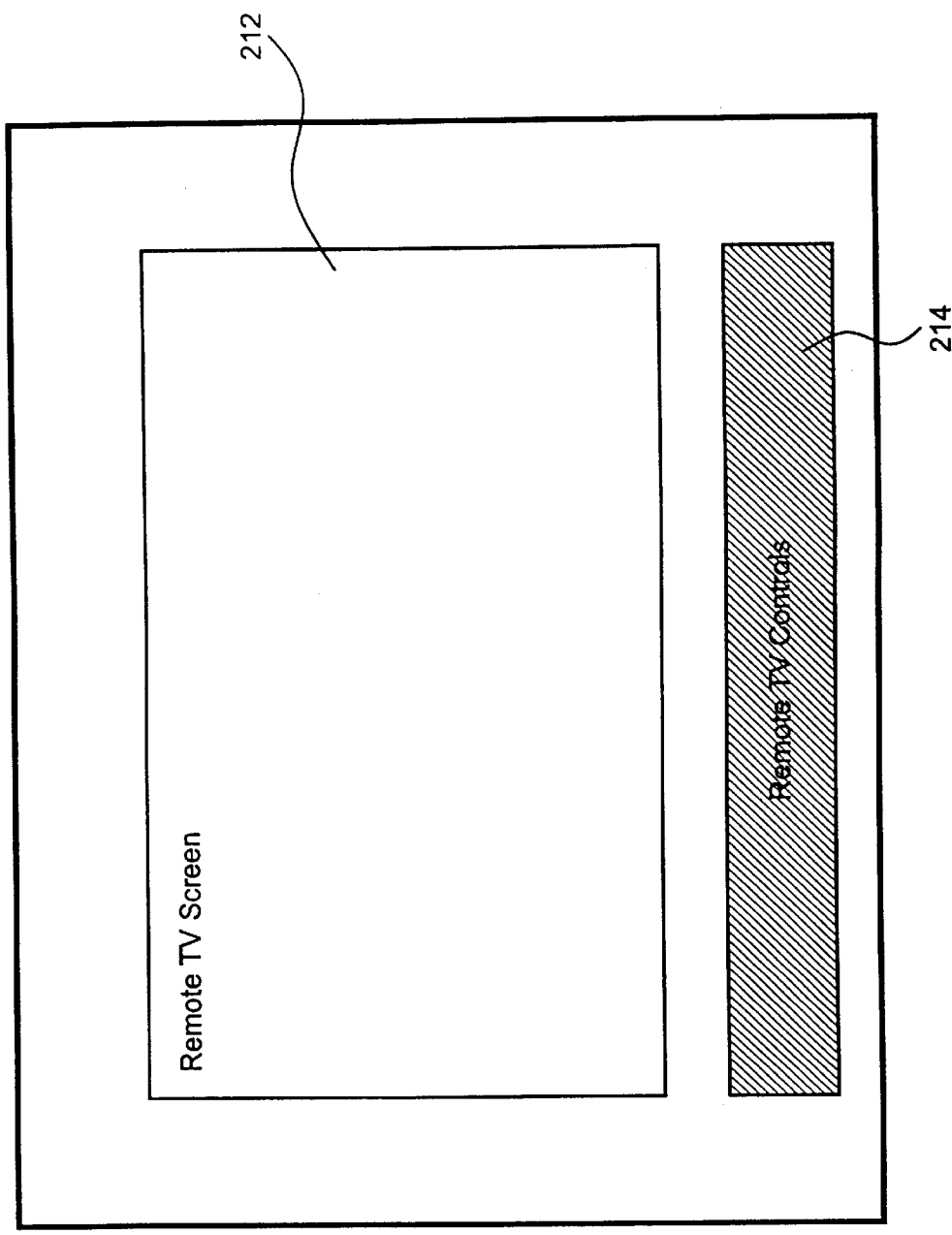
FIG. 2 is a drawing of the remote television of FIG. 1, in accordance with one embodiment of the present invention.

Referring now to FIG. 2, a drawing of the FIG. 1 remote TV 158 is shown, in accordance with one embodiment of the present invention. In the FIG. 2 embodiment, remote TV 158 preferably includes, but is not limited to, a remote TV screen 212 and remote TV controls 214. Remote TV 158 is preferably implemented as a light-weight portable display device that receives a broadcast stream from wireless base station 156, and responsively displays at least one selectable program source 112 on remote TV screen 212. In alternate embodiments, remote TV 158 may be implemented as a personal digital assistant (PDA) device, a notepad personal computer or any other desired display device.

In the FIG. 2 embodiment, remote TV controls 214 may include conventional controls and programmable controls that may be used by a viewer to control certain operating parameters of wireless television system 110. For example, remote TV controls 214 may be used either to control the operation of remote TV 158, or to control the operation of other components and subsystems in system 110 through a wireless transmission (for example, selecting a program source 112 through switcher 138). Remote TV screen 212 preferably includes color or monochrome display components that may be implemented using any appropriate and compatible display technology. In addition, remote TV screen 212 may employ touch-screen technology to control various display operating parameters as well as other technologies such as handwriting or voice input recognition.

In alternate embodiments, remote TV 158 may readily be implemented in any other desired manner. For example, remote TV 158 may be implemented as a wireless non-portable television in order to perform various types of special viewing applications that may require a wireless display. The operation and functionality of remote TV 158 are further discussed below in conjunction with FIG. 7.

Figure 3:
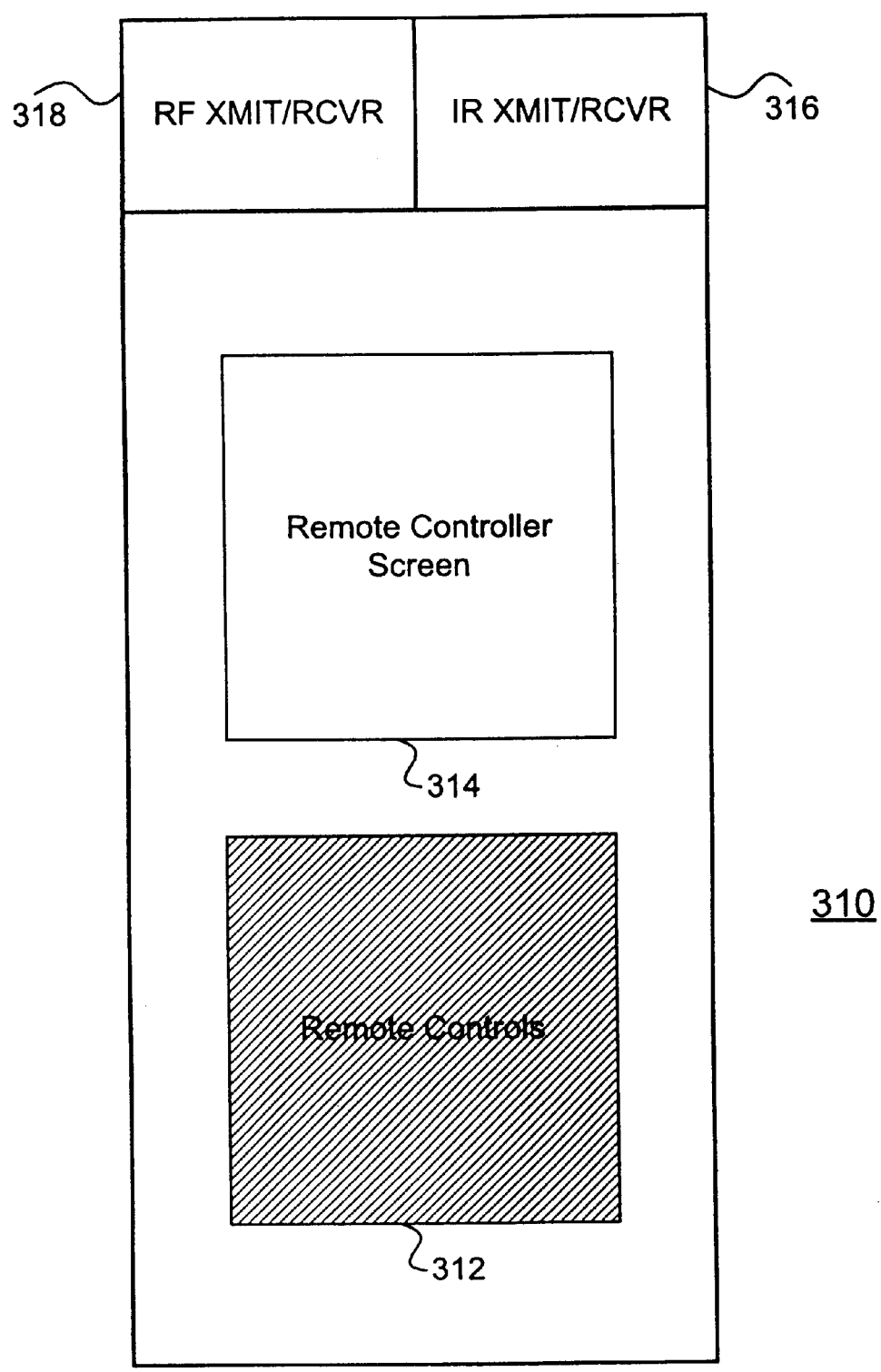
FIG. 3 is a drawing of a remote controller for use with the wireless television system of FIG. 1, in accordance with one embodiment of the present invention.

Referring now to FIG. 3, a drawing of a remote controller 310 for use with the FIG. 1 wireless television system 110 is shown, in accordance with one embodiment of the present invention. In the FIG. 3 embodiment, remote controller 310 is a hand-held device that preferably includes, but is not limited to, a remote controller screen 314, remote controls 312, a radio-frequency transmitter/receiver (RF XMIT/RCVR) 318 and an infrared transmitter/receiver (IR XMIT/RCVR) 316.

In the FIG. 3 embodiment, remote controls 312 may be used by a viewer to control various components and operating parameters of wireless television system 110. For example, remote controls 312 may be used to control the operation of other components and subsystems in system 110 through a wireless transmission process using either RF XMIT/RCVR 318 or IR XMIT/RCVR 316.

Remote controller screen 314 preferably includes display components that may be implemented using any appropriate and compatible display technology. Remote controller 310 may thus advantageously receive a broadcast stream from wireless base station 156 through either RF XMIT/RCVR 318 or IR XMIT/RCVR 316, and responsively display at least one selectable program source 112 on remote controller screen 314.

In one embodiment, remote controller screen 314 may thereby allow system users to preview various different selectable program sources 112 while simultaneously viewing an uninterrupted primary program source 112 on primary TV 152 or on remote TV 158. In the foregoing preview function, remote controller screen may receive a wireless transmission originating from a separate picture-in-picture (PIP) tuner in wireless television system 110. The preview function may therefore be utilized for functions like programming VCR 126 or previewing other channels without interrupting other concurrent program viewing activities. The operation and functionality of remote controller 310 are further discussed below in conjunction with FIG. 7.

Figure 4:
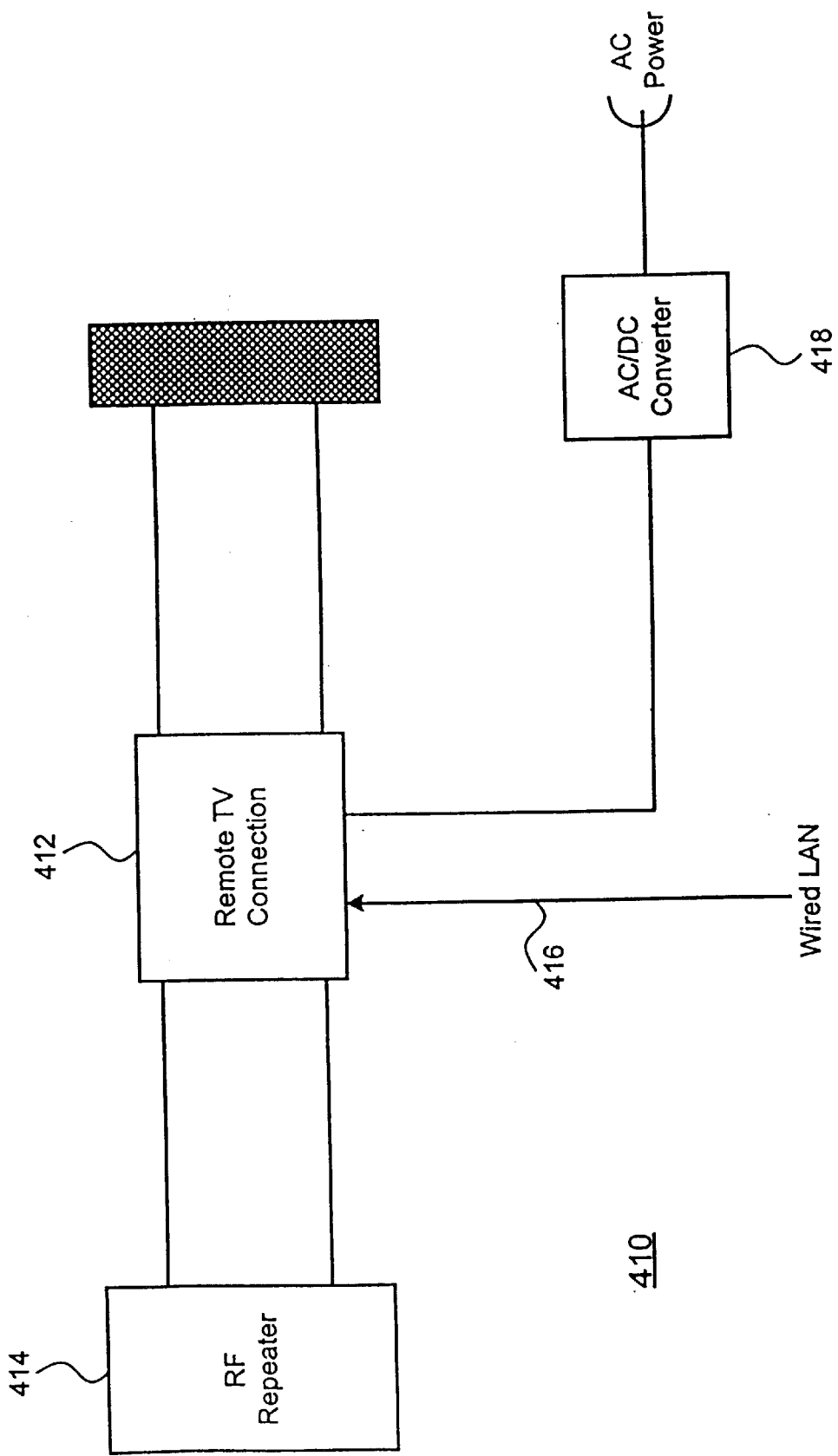
FIG. 4 is a drawing of an auxiliary base station for use with the wireless television system of FIG. 1, in accordance with one embodiment of present invention.

Referring now to FIG. 4, a drawing of an auxiliary base station 410 for use with the FIG. 1 wireless television system 110 is shown, in accordance with one embodiment of present invention. In the FIG. 4 embodiment, auxiliary base station 410 includes, but is not limited to, a radio-frequency (RF) repeater 414, a remote TV connection 412, and an alternating current/direct current (AC/DC) converter 418. In alternate embodiments, auxiliary base station 410 may readily be implemented to include various other components that are different from, or in addition to, those discussed in conjunction with the FIG. 4 embodiment.

In the FIG. 4 embodiment, RF repeater 414 preferably provides an enhanced transmission of one or more program sources 112 to remote TV 158 or remote controller 310 to thereby advantageously improve transmission quality in situations where remote TV 158 or remote controller 310 cannot receive adequate wireless transmissions directly from wireless base station 156. For example, various factors such as wall density and composition, or physical distances from wireless base station 156 may significantly deteriorate transmission strength and quality.

In accordance with the present invention, RF repeater 414 may then receive and enhance a broadcast stream that is transmitted directly from wireless base station 156 using radio-frequency transmission techniques. Alternately, RF repeater 414 may receive and enhance program source transmissions and transport various types of control information provided over a hard-wired home network (wired local-area network (LAN) 416) that may be implemented using any suitable techniques and configurations.

In certain embodiments, wireless television system 110 may include multiple auxiliary base stations 410 that each operate on a different transmission subchannel. In accordance with the present invention, remote TV 158 or remote controller 310 may therefore advantageously search to locate a particular subchannel that provides the highest quality transmission signal, and then transparently switch to the corresponding auxiliary base station 410 for optimal wireless transmission.

In the FIG. 4 embodiment, a system user may store remote TV 158 on auxiliary base station 410 by connecting remote TV 158 to remote TV connection 412. Further more, AC/DC converter 418 may provide operating power to RF repeater 414, and may also recharge batteries in remote TV 158 through remote TV connection 412.

Figure 5:
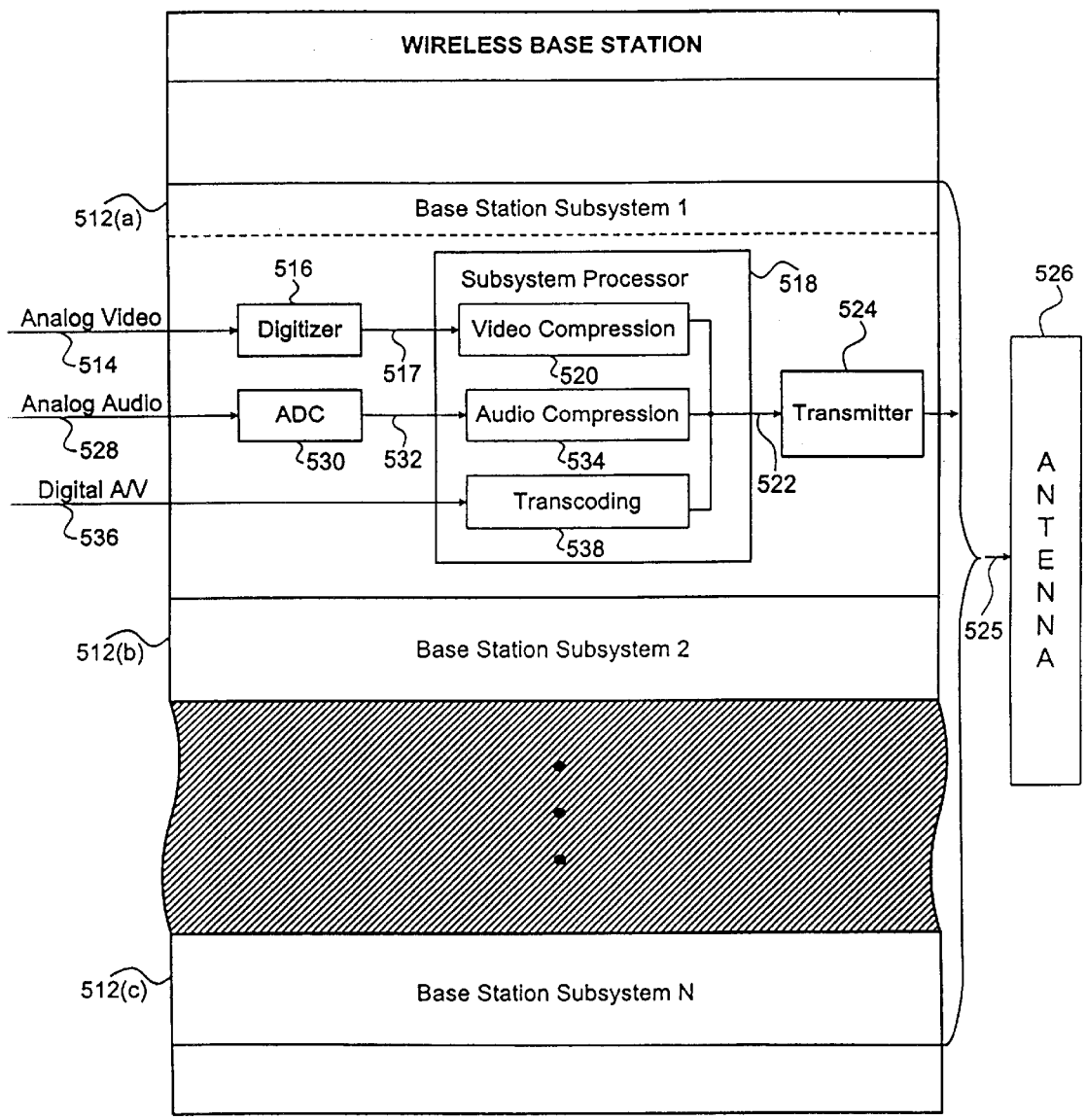
FIG. 5 is a block diagram of the wireless base station of FIG. 1, in accordance with one embodiment of present invention.

Referring now to FIG. 5, a block diagram of the FIG. 1 wireless base station 156 is shown, in accordance with one embodiment of present invention. In the FIG. 5 embodiment, wireless base station 156 preferably includes, but is not limited to, a base station subsystem 1 (512(*a*)) through a base station subsystem N (512(*c*)), and an antenna 526.

In the FIG. 5 embodiment, wireless base station 156 preferably may utilize various advanced radio-frequency transmission techniques, such as spread-spectrum broadcasting via code division multiple access (CDMA). Therefore, each base station subsystem (512(*a*) through 512(*c*)) may be efficiently implemented using a same or similar configuration, and may each correspond to a separate radio-frequency transmission sub-channel. However, for purposes of clarity in FIG. 5, only base subsystem 1 (512(*a*)) includes a block diagram of selected modules that are typically present in each base station subsystem 516(*a* through *c*) of wireless base station 156. In alternate embodiments, wireless base station 156 may readily be implemented to include various configurations, components, and subsystems other than those discussed in conjunction with the FIG. 5 embodiment.

In the FIG. 5 embodiment, base station subsystem 512(*a*) preferably receives various input signals that may include analog video on path 514, analog audio on path 528, and digital audio/video (A/V) data on path 536. In alternate embodiments, base station subsystem 512(*a*) may readily receive any other types of appropriate and compatible input signals.

In accordance with the present invention, subsystem processor 518 preferably receives various information from program sources 112 that may be encoded using an extensive variety of formats and configurations. Subsystem processor 518 then preferably processes and manipulates the received program sources 112 to advantageously generate processed program information in a particular format that is compatible for downstream use by transmitter 324 and remote TV 158. For example, in an economical home-use installation, subsystem processor 518 may receive a high-frequency digital video bitstream, and responsively down-convert the video bitstream to a bit rate that is more appropriate for economical transmission techniques. Subsystem processor 518 may also perform various other functions, including image bit allocation based on a particular configuration of remote TV 158, programmable image resolution with filtered image-size scaling, and identifier-key detection for enabling access to premium programming.

In the case of analog video information, digitizer 516 converts the analog video on path 514 into digital video that subsystem processor 518 then receives via path 517. Subsystem processor 518 responsively performs various signal processing procedures on the received digital video, preferably including video compression 520. In one embodiment of the present invention, video compression 520 preferably includes various MPEG-2 techniques and processes. Following the foregoing video signal processing procedures, subsystem processor 518 preferably provides the processed video to transmitter 524 via path 522.

Processing of video may also include various forms of frame rate conversion in order to reduce the bit rate provided to transmitter 524. In a simple example of reducing the frame rate, a 60 field NTSC input video may be dropped down to 30 fields per second by dropping every other field. A more complex technique for reducing the frame rate may include de-interlacing the fields into frames either through processing the fields or by detection of film content and through the technique of "3:2 pull down" converting the fields back to the original 24 frames per second of the movie content. Most LCD displays are non-interlaced and de-interlacing prior to transmission may result in a more efficient system.

In the case of analog audio information, analog-to-digital converter (ADC) 530 converts analog audio on path 528 into digital audio that subsystem processor 518 then receives via path 532. Subsystem processor 518 responsively performs various signal processing procedures on the received digital audio, preferably including audio compression 534. In one embodiment of the present invention, audio compression 534 preferably includes various MPEG-2 techniques and processes. Following the foregoing audio signal processing procedures, subsystem processor 518 preferably provides the processed audio to transmitter 524 via path 522.

In the case of digital audio/video data received on path 536, subsystem processor 518 performs various signal processing procedures on the received digital audio/video bitstream, preferably including transcoding 538. In one embodiment of the present invention, transcoding 538 preferably converts the digital A/V data received on path 536 into processed data that includes a different and more appropriate bit rate, as discussed above. Digital A/V bus may follow a standard such as the IEEE 1394. Alternatively, the video may be in an analog format while the audio follows a digital standard such as S/PDIF (Sony/Philips Digital Interface) where the audio can either be in a compressed or non-compressed digital format. Compressed audio may include multi-channel audio such as rear channels or a subwoofer channel. In the case of multi-channel audio, the signal processing of 518 may perform processing to reduce the number of audio channels either through dropping of audio channels or through processing to produce the effect of multiple audio channels coded into a reduced number of audio channels. Following the foregoing signal processing procedures, subsystem processor 518 provides the processed data to transmitter 524 via path 522.

Therefore, subsystem processor 518 may advantageously receive one or more program sources 112 that are formatted in any appropriate manner, and responsively generate a processed stream that is formatted in any appropriate manner. For example, subsystem processor 518 may receive MPEG-2 variable bit rate video programming and responsively generate a constant bit rate stream that may be formatted as an MPEG-2 elementary, packetized elementary, program or transport stream. Similarly, subsystem processor 518 may receive high-definition television (HDTV) video programming and responsively generate a standard definition television stream.

In the FIG. 5 embodiment, transmitter 524 may be implemented to include any desired types of effective transmission techniques, including spread spectrum methods via code division multiple access (CDMA) that may utilize frequency-hopping or direct sequencing techniques. Transmitter 524 preferably receives the processed and combined video, audio, and data from subsystem processor 518 as a transport stream, and responsively transmits a broadcast stream to remote TV 158 or remote controller 310 via path 525 and antenna 526. More detailed operation and functionality for one embodiment of a base station subsystem 512 are further discussed below in conjunction with FIG. 6.

Figure 6:
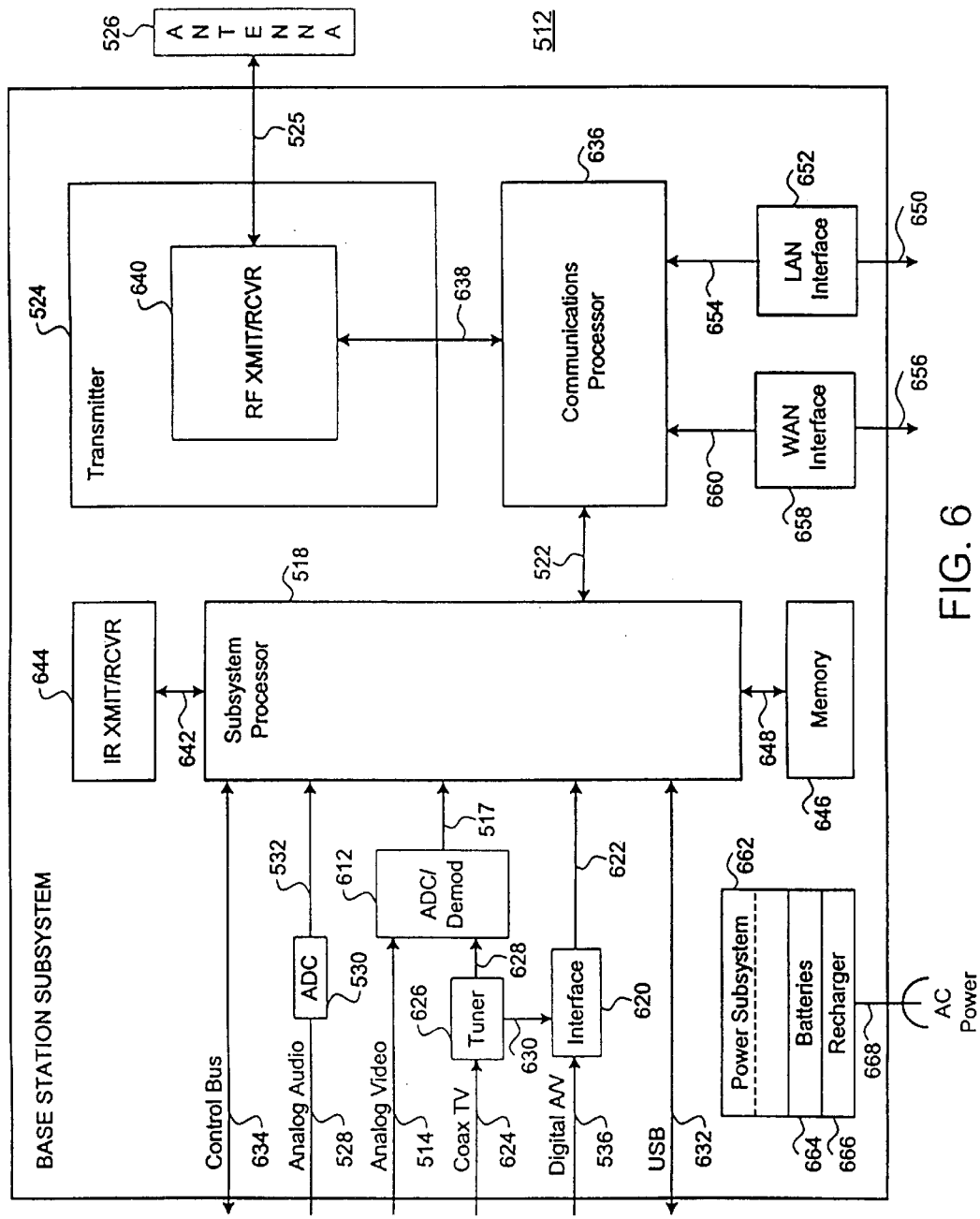
FIG. 6 is a block diagram of an exemplary base station subsystem, in accordance with one embodiment of present invention.

Referring now to FIG. 6, a block diagram of an exemplary base station subsystem 512 is shown, in accordance with one embodiment of the present invention. In the FIG. 6 embodiment, base station subsystem 512 preferably includes, but is not limited to, a subsystem processor 518, an infrared transmitter/receiver (IR XMIT/RCVR) 644, a memory 646, a wide-area network (WAN) interface 658, a local-area network (LAN) interface 652, a communications processor 636, a transmitter 524, an antenna 526, and a power subsystem 662. In alternate embodiments, base station subsystem 512 may readily be implemented to include various components that are different from, or in addition to, those discussed in conjunction with the FIG. 6 embodiment.

In the FIG. 6 embodiment, subsystem processor 518 preferably may receive various selectable program signals from any appropriate source, including program sources 112 (FIG. 1). Subsystem processor 518 then responsively processes and manipulates the received program signals to generate a processed output stream on path 522, as discussed above in conjunction with FIG. 5. Subsystem processor 518 preferably also communicates with memory 646 via path 648. Memory 646 may be configured using any desired format, and may be utilized to store any information required by wireless television system 110, including various processing software instructions for subsystem processor 518.

In the FIG. 6 embodiment, subsystem processor 518 may receive analog audio via path 528, analog-to-digital converter 530, and path 532. Subsystem processor 518 may also receive analog video via path 514, analog-to-digital converter/demodulator (ADC/Demod) 612, and path 517. Similarly, subsystem processor 518 may receive digital audio/video (A/V) data via path 536, bus interface 620, and path 622.

In addition, a tuner 626 may receive a coaxial television signal (Coax TV) on path 536 and responsively provide a selectable television source to subsystem processor 518 through either path 630 (for digital TV signals), or through path 628 (for analog TV signals). Subsystem processor 518 may also utilize universal serial bus (USB) 632 to communicate directly with various devices such as personal computer 114 (FIG. 1).

In accordance with the present invention, subsystem processor 518 may also advantageously communicate with compatible components throughout wireless television system 110 using a control bus 634. In the FIG. 6 embodiment, control bus 634 may be implemented using any compatible configuration and/or protocol. For example, control bus 634 may be effectively implemented in accordance with a control bus standard, and may also utilize various signaling protocols and techniques in compliance with a Home Audio-Video Home Interoperability (HAVI) standard.

In the FIG. 6 embodiment, subsystem processor 518 preferably combines processed video, processed audio, and processed data to thereby provide a processed stream comprising one or more selectable processed program sources 112 to communications processor 636 through path 522. In response, communications processor 636 performs a network processing procedure on the processed stream to generate a transmitter-ready stream to radio-frequency transmitter/receiver (RF XMIT/RCVR) 640 via path 638. Communications processor 636 preferably performs the foregoing network processing procedure in response to relevant characteristics of wireless television system 110. For example, the network processing procedure may depend on various factors such as the particular wireless transmission techniques utilized for effective wireless transmission or the type of bus arbitration required for WAN or LAN interfaces.

In the FIG. 6 embodiment, RF XMIT/RCVR 640 may then manipulate (for example, up-convert and modulate) the transmitter-ready stream to advantageously generate and transmit a broadcast stream through path 525 and antenna 526 to remote TV 158, remote controller 310, or auxiliary base station 410, in accordance with the present invention. In the FIG. 6 embodiment, RF XMIT/RCVR 640 may be implemented to include any desired types of effective up-conversion, modulation, or other wireless transmission techniques, including spread spectrum methods via code division multiple access (CDMA) that may utilize appropriate frequency-hopping or direct sequencing techniques. In one embodiment of the present invention, subsystem processor 518 may also transmit the processed stream to remote TV 158, remote controller 310, or auxiliary base station 410 using IR XMIT/RCVR 644. Wireless base station 156 also preferably embodies one or more effective transmission protocols that include isochronous support for transmission of multimedia information.

In the FIG. 6 embodiment, base station subsystem 512 may communicate with various wide-area networks (such as the Internet) via WAN interface 656. For example, subsystem processor 518 may readily access digital A/V data from the Internet via path 656, WAN interface 658, path 660, communications processor 636, and path 522. Subsystem processor 518 may then process the Internet A/V data, and subsequently provide the processed Internet A/V data through path 522 to communications processor 636 for wireless transmission by RF XMIT/RCVR 640, as discussed above. In accordance with the present invention, communications processor 636 may also provide the transmitter-ready stream to RF repeater 414 in auxiliary base station 410 via path 654, LAN interface 652, and path 650, as discussed above in conjunction with FIG. 4. In some systems, for example a cable modem system, the WAN connection 656 may physically be the same as the Coax TV interface 624. In another system, such as a home network using the standard phone line, the WAN connection 656 may physically be the same as the LAN interface connection 650.

In the FIG. 6 embodiment, remote TV 158 or remote controller 310 may advantageously transmit wireless radio-frequency control information to subsystem processor 518 through antenna 526, RF XMIT/RCVR 640, and communications processor 636. In response, subsystem processor 518 may function as a master controller to utilize the received wireless radio-frequency control information for controlling various components and functionalities in wireless television system 110. Subsystem processor 518 may use the received RF control information in any suitable manner. For example, subsystem processor 518 may control appropriate system components either by hard-wired connections, by utilizing control bus 634, or by transmitting the control information through path 642 and infrared transmitter/receiver (IR XMIT/RCVR) 644.

In accordance with the present invention, subsystem processor 518 may also utilize IR XMIT/RCVR 644 and RF XMIT/RCVR 640 to advantageously monitor all remotely-generated system control signals. Subsystem processor 518 may then responsively maintain corresponding system component status information in memory 646 to facilitate intelligent system control interaction in wireless television system 110. For example, a system user in a viewing location that is remote from program sources 112 may be unaware of the current status of a given program source, such as VCR 126. According to the present invention, subsystem processor 518 may therefore utilize the stored component status information to intelligently respond to a remote viewer request that is provided by wireless transmission from remote TV 158 or remote controller 310.

In the FIG. 6 embodiment, power subsystem 662 preferably provides operating power for base station subsystem 512. Power subsystem 662 preferably includes a recharger 666 for recharging remote TV 158 and remote controller 310. Power subsystem 622 also preferably includes batteries 664 which may serve as a backup power source so that, even when main operating power is turned off, base station subsystem 512 may still monitor system control information to components of wireless television system 110, and thereby maintain current system status information in memory 646.

Figure 7:
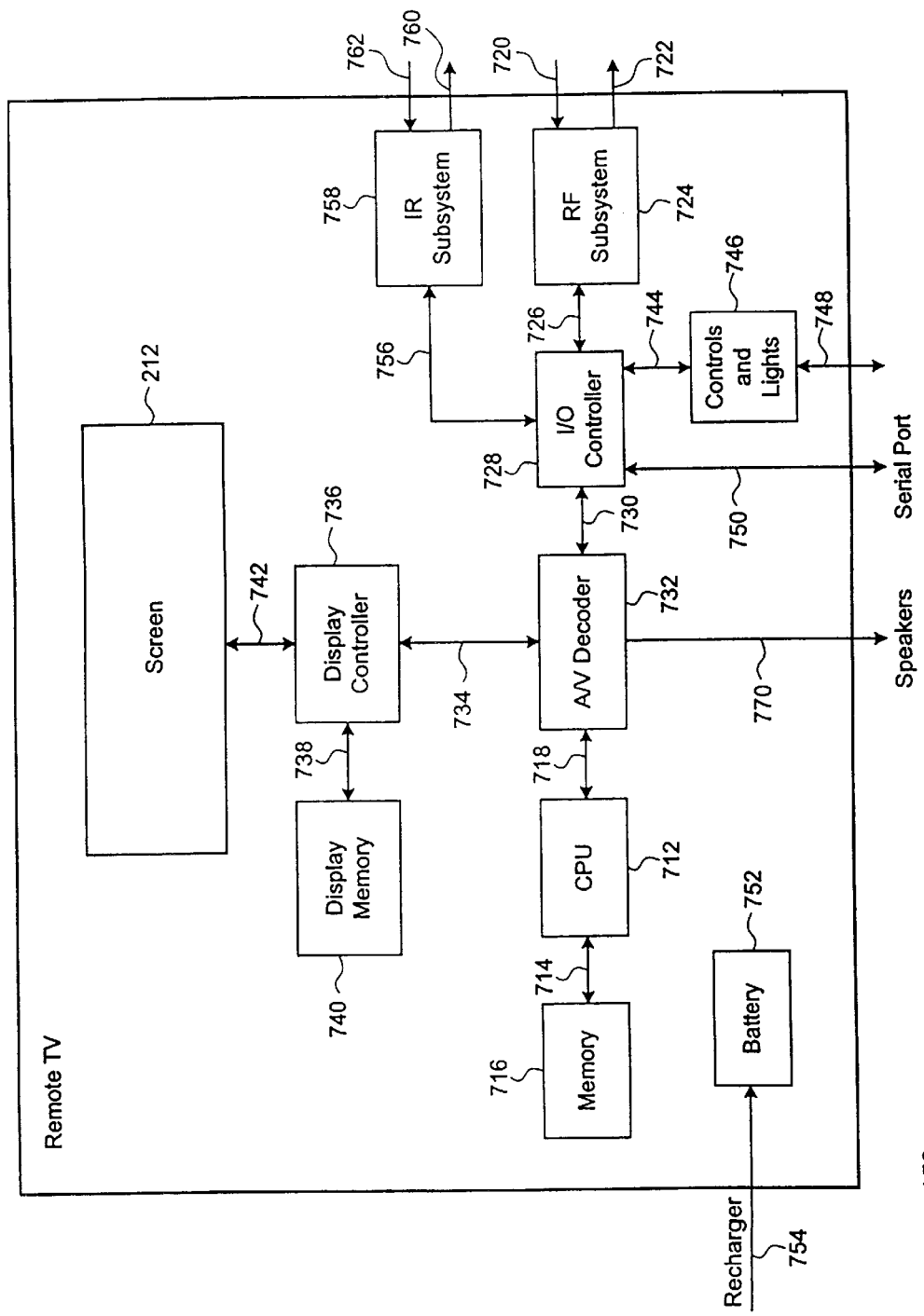
FIG. 7 is a block diagram of the remote television from FIG. 1, in accordance with one embodiment of present invention.

Referring now to FIG. 7, a block diagram of the FIG. 1 remote TV 158 is shown, in accordance with one embodiment of present invention. For reasons of clarity, the following discussion of the FIG. 7 embodiment is made in reference to remote TV 158. However, in accordance with the present invention, the FIG. 7 embodiment is equally descriptive of selected functional components from either remote TV 158 or remote controller 310. In alternate embodiments, remote TV 158 and remote controller 310 may readily be implemented using various techniques and designs other than those discussed in conjunction with the FIG. 7 embodiment.

In the FIG. 7 embodiment, remote TV 158 preferably receives a broadcast stream from RF XMIT/RCVR 640 of wireless base station 156 (or RF repeater 414 of auxiliary base station 410) through an integral portable antenna that couples the broadcast stream through path 720 to radio-frequency (RF) subsystem 724. Radio-frequency (RF) subsystem 724 responsively processes (for example, down-converts and demodulates) the broadcast stream to generate a baseband stream.

Input/output (I/O) controller 728 then preferably receives the baseband stream via path 726 and responsively provides the baseband stream via path 730 to audio/video (A/V) decoder 732. Under the control of central processing unit (CPU) 712, and in response to various software instructions stored in memory 716, A/V decoder then preferably demultiplexes and decodes the baseband stream to generate separate decoded video, audio, and data information.

Display controller 736 may then receive the decoded video and data via path 734, and temporarily store the decoded video and data into display memory 740 via path 738. At the appropriate time, display controller 736 may then retrieve the decoded video and data from display memory 740, and provide the decoded video and data via path 742 to remote TV screen 212 for display to a system user. Display controller 736 may also provide the decoded audio to an amplifier and speakers for aural reproduction via path 770.

In the FIG. 7 embodiment, infrared (IR) subsystem 758 may alternately receive a broadcast stream from IR XMIT/RCVR 644 of wireless base station 156 through path 762. IR subsystem 758 may then provide the broadcast stream to I/O controller 728 via path 756 for further downstream manipulation and display, as discussed above.

In accordance with the present invention, a system user may supply desired component control information to I/O controller 728 by using controls and lights 746 and path 744, or by using any other appropriate means. I/O controller may then wirelessly transmit the component control information to wireless base station 156 via path 726, RF subsystem 724, and path 722, or via path 756, IR subsystem 758, and path 760, as discussed above in conjunction with FIG. 6.

In the FIG. 7 embodiment, remote TV 158 preferably includes a battery 752 that supplies display operating power, and which may be recharged via path 754. Remote TV 158 may also comprise a serial port 750, such as a universal serial bus (USB), for connecting remote TV 158 to a host personal computer to thereby allow various interactive processes, including performing setup, data exchange, and backup procedures for remote TV 158. Alternatively, the host personal computer may use the RF, IR or LAN connections for setup, data exchange and backup producedures for remote TV 158.

Figure 8:
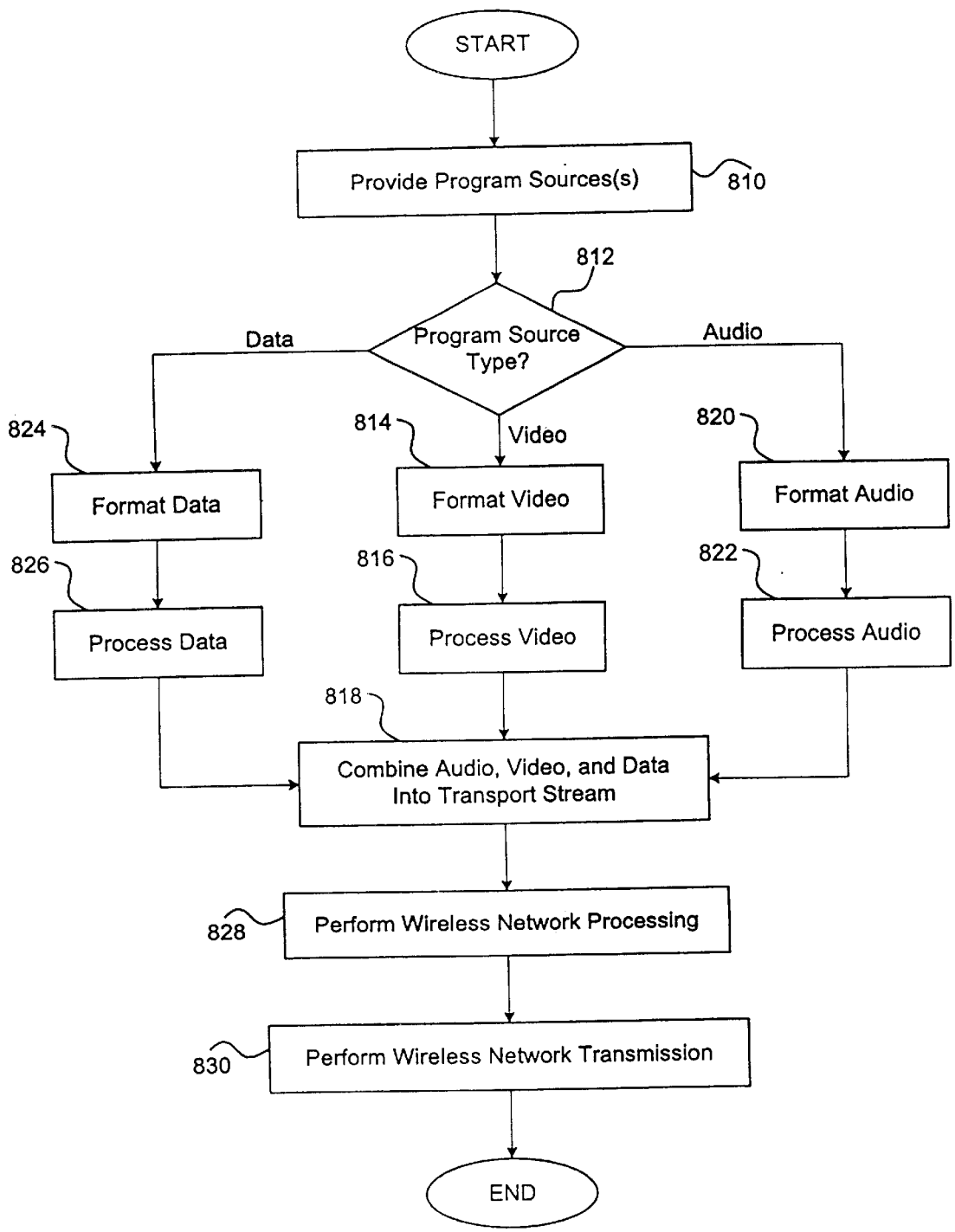
FIG. 8 is a flowchart of method steps for performing a wireless transmission procedure, in accordance with one embodiment of present invention.

Referring now to FIG. 8, a flowchart of method steps for performing a wireless transmission procedure is shown, in accordance with one embodiment of present invention. In the FIG. 8 embodiment, initially, in step 810, wireless television system 110 provides one or more program sources 112 to wireless base station 156. In step 812, wireless base station 156 differentiates various types of program sources 112 depending on whether the program source(s) 112 include any combination of digital A/V data, analog video, or analog audio information.

If program source 112 includes digital A/V data, then, in step 824, wireless base station 156 preferably formats the digital A/V data into an appropriate format, and provides the formatted data to subsystem processor 518 in wireless base station 156. In step 826, subsystem processor 518 responsively processes the formatted data to generate processed data (for example, by transcoding), and then the FIG. 8 process advances to step 818.

Similarly, if program source 112 includes analog video, then, in step 814, wireless base station 156 formats the analog video into an appropriate format, and provides the formatted video to subsystem processor 518 in wireless base station 156. For example, ADC/Demod 612 may convert the analog video into an appropriate digital format. Then, in step 816, subsystem processor 518 responsively processes the formatted video to generate processed video, and the FIG. 8 process advances to step 818.

In addition, if program source 112 includes analog audio, then, in step 820, wireless base station 156 formats the analog audio into an appropriate format, and provides the formatted audio to subsystem processor 518 in wireless base station 156. For example, ADC 530 may convert the analog video into an appropriate digital format. In step 822, subsystem processor 518 responsively processes the formatted audio to generate processed audio, and then the FIG. 8 process advances to step 818.

In step 818, subsystem processor 518 preferably combines the processed audio, video, and data into a processed stream. Then, in step 828, communications processor 636 receives the processed stream generated in foregoing step 818, and responsively performs a wireless network processing procedure to generate a transmitter-ready stream. Finally, in step 830, transmitter 524 receives and modulates the transmitter-ready stream, and advantageously performs a wireless network transmission process to propagate a broadcast stream to remote TV 158, remote controller 310, auxiliary base station 410, or any other compatible receiver device, in accordance with the present invention.

Figure 9:
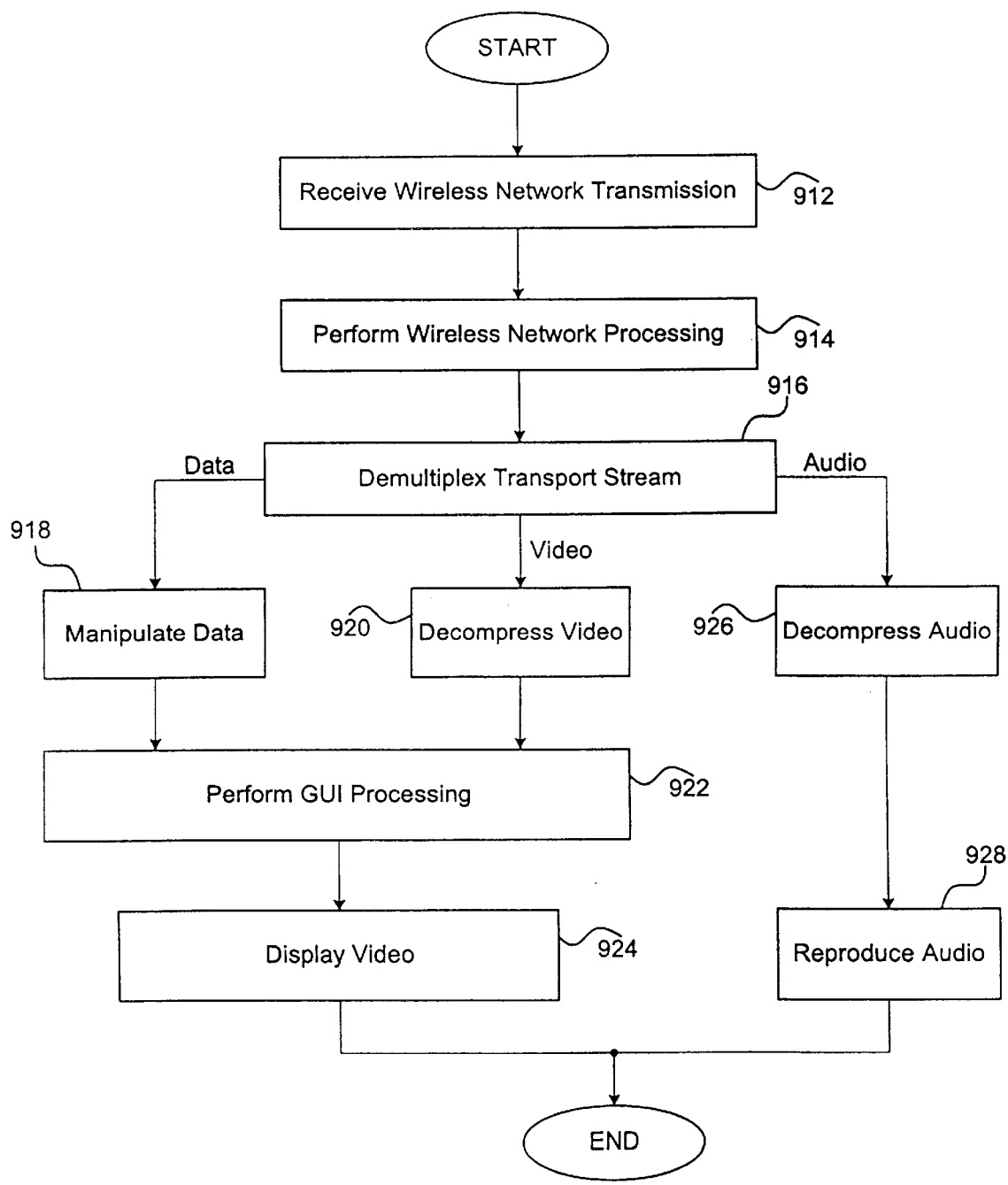
FIG. 9 is a flowchart of method steps for performing a wireless reception procedure, in accordance with one embodiment of present invention.

Referring now to FIG. 9, a flowchart of method steps for performing a wireless reception procedure is shown, in accordance with one embodiment of present invention. For reasons of clarity, the FIG. 7 wireless reception procedure is discussed in reference to remote TV 158. However, wireless reception by remote controller 310, auxiliary base station 410, or any other compatible receiver device is equally contemplated for use in conjunction with the present invention.

In the FIG. 9 embodiment, initially, in step 912, remote TV 158 preferably receives a broadcast stream from wireless base station 156. Then, in step 914, RF subsystem 724 preferably performs a wireless network processing procedure to generate a baseband stream. The foregoing wireless network processing procedure may include various appropriate techniques, such as demodulation and down-conversion of the broadcast stream propagated from wireless base station 156.

In step 916, A/V decoder 732 preferably receives and demultiplexes the baseband stream into separate components which may include separate data, video, and audio information. If the baseband stream includes data information, then, in step 918, A/V decoder 732 preferably manipulates the data information into an appropriate format to generate manipulated data, and the FIG. 9 process advances to step 922. Similarly, if the baseband stream includes video information, then, in step 920, A/V decoder 732 preferably decompresses the video information to generate decompressed video, and the FIG. 9 process advances to step 922.

In addition, if the baseband stream includes audio information, then in step 926, A/V decoder 732 preferably decompresses the audio information to generate decompressed audio. In step 928, A/V decoder 732 may preferably provide the decompressed audio to an amplifier and speakers which operate to aurally reproduce the decompressed audio.

In step 922, display controller 736 preferably may access the manipulated data (step 918) and the decompressed video (step 920), and responsively perform a graphical user interface (GUI) processing procedure to generate display data and display video for presentation on remote TV 158. Finally, in step 924, display controller 736 provides the display data and the display video to remote TV screen 212 for viewing by a user of wireless television system 110.

The present invention therefore implements a flexible wireless television system that a user may effectively utilize in a wide variety of applications. For example, a video camera device may generate a wireless transmission to remote TV 158 for purposes such as surveillance and monitoring, or the transmission can be received by wireless base station 156 and the transmission stored on a connected storage device. Remote TV 158 may also generate a query to wireless television system 110 for purposes such as determining current programming of VCR 126. A user may likewise receive a telephone communication via remote TV 158 while simultaneously viewing a caller ID display, or may similarly utilize wireless television system to interact with an Internet browser program.

In addition, a viewer may flexibly utilize wireless television system 110 for displaying information from a home server (such as viewing a personal recipe collection while cooking), for displaying various user profiles (such as a particular viewer's favorite television channels), or for sequencing through images in a "picture frame" mode when remote TV 158 is not otherwise in use. Therefore, the present invention effectively implements a flexible wireless television system that utilizes various heterogeneous components to facilitate optimal system interoperability and functionality.

The invention has been explained above with reference to a preferred embodiment. Other embodiments will be apparent to those skilled in the art in light of this disclosure. For example, the present invention may readily be implemented using configurations other than those described in the preferred embodiment above. Additionally, the present invention may effectively be used in conjunction with systems other than the one described above as the preferred embodiment. Therefore, these and other variations upon the preferred embodiments are intended to be covered by the present invention, which is limited only by the appended claims.

What is claimed is:

1. An apparatus for implementing a wireless television system, comprising:

a selectable program source coupled to said wireless television system for providing program information;

a wireless base station coupled to said selectable program source for processing and wirelessly transmitting said program information; and a display device configured to wirelessly receive said program information and responsively display said program information in variable viewing locations, wherein a subsystem processor in said wireless base station receives and responsively processes analog video, analog audio, and digital audio-video data components of said program information to provide a combined output stream to a wireless transmitter that responsively propagates a broadcast stream to said display device.

2. An apparatus for implementing a wireless television system, comprising:

a selectable program source coupled to said wireless television system for providing program information;

a wireless base station coupled to said selectable program source for processing and wirelessly transmitting said program information; and a display device configured to wirelessly receive said program information and responsively display said program information in variable viewing locations, wherein a switcher device chooses said program information by controlling one or more outputs of said selectable program source, said switcher being wirelessly controllable by using said display device.

3. The apparatus of claim 2 wherein said switcher device provides visual portions of said program information to a primary television for stationary viewing, and wherein said switcher device provides aural portions of said program information to speakers for stationary listening.

4. An apparatus for implementing a wireless television system, comprising:

a selectable program source coupled to said wireless television system for providing program information;

a wireless base station coupled to said selectable program source for processing and wirelessly transmitting said program information; and a display device configured to wirelessly receive said program information and responsively display said program information in variable viewing locations, wherein said wireless base station includes a series of similar base station subsystems that each correspond to a different transmission subchannel.

5. An apparatus for implementing a wireless television system, comprising:

a selectable program source coupled to said wireless television system for providing program information, said program information including analog video, analog audio, and digital audio/video data;

a wireless base station coupled to said selectable program source for processing and wirelessly transmitting said program information, said wireless base station including a base station subsystem for formatting said program information to generate formatted video, formatted audio, and formatted data, and a subsystem processor that processes said formatted video to generate processed video, processes said formatted audio to generate processed audio, and processes said formatted data to generate processed data, said subsystem processor subsequently combining said processed video, said processed audio, and said processed data to responsively generate a processed output stream; and a display device configured to wirelessly receive said program information and responsively display said program information in variable viewing locations.

6. The apparatus of claim 5 wherein said subsystem processor compresses said formatted video, compresses said formatted audio, and transcodes said formatted data.

7. The apparatus of claim 6 wherein said subsystem processor compresses said formatted video and said formatted audio in accordance with an MPEG-2 specification, and wherein said subsystem processor transcodes said formatted data by converting a data bit rate of said formatted data to achieve an optimal compatibility with said wireless television system.

8. The apparatus of claim 5 wherein a communications processor accesses and manipulates said processed stream to generate a transmitter-ready output stream depending upon transmission characteristics of said wireless television system.

9. The apparatus of claim 8 wherein a transmitter accesses said transmitter-ready output stream, and responsively up-converts and modulates said transmitter-ready output stream to propagate a broadcast output stream through an antenna device to said display device.

10. The apparatus of claim 9 wherein an auxiliary base station receives said broadcast stream with a radio-frequency repeater that re-broadcasts said broadcast stream to said display device to improve broadcast signal characteristics.

11. The apparatus of claim 10 wherein said radio-frequency repeater receives said transmitter-ready broadcast stream through a wired local-area network.

12. The apparatus of claim 10 wherein said auxiliary base station includes a remote television connection for storing said display device and for recharging operating batteries in said display device.

13. An apparatus for implementing a wireless television system, comprising:

a selectable program source coupled to said wireless television system for providing program information;

a wireless base station coupled to said selectable program source for processing and wirelessly transmitting said program information;

a display device configured to wirelessly receive said program information and responsively display said program information in variable viewing locations, wherein said display device comprises a radio-frequency subsystem that receives a broadcast stream corresponding to said program information, and responsively down-converts and demodulates said broadcast stream to generate a baseband stream;

an A/V decoder that demultiplexes said baseband stream to generate separate information components that include demultiplexed video, demultiplexed audio, and demultiplexed data, said A/V decoder decompressing said demultiplexed video to generate decompressed video, decompressing said demultiplexed audio to generate decompressed audio, and manipulating said demultiplexed data to generate manipulated data; and a display controller that preforms graphical user interface processing to said decompressed video to generate display video, and wherein said display controller that preforms graphical user interface processing to said manipulated data to generate display data, said display video and said display data then being displayed upon a display screen of said display device, said display device being alternately implemented as a hand-held remote controller device that includes a compact display screen which reproduces said broadcast stream as generated from a picture-in-picture turner, whereby said hand-held remote controller device is used to preview secondary program information while simultaneously viewing uninterrupted primary program information.

14. The apparatus of claim 13 wherein said A/V decoder provides said demultiplexed audio to an amplifier and speakers for aural reproduction.

15. The apparatus of claim 13 wherein said display device and said hand-held remote controller device each include a radio-frequency transmitter and an infrared transmitter for transmitting control information to said wireless base station and other components in said wireless television system.

16. The apparatus of claim 13 wherein said display device and said hand-held remote controller device each include an infrared receiver for receiving a broadcast stream from said wireless base station or an auxiliary base station.

17. An apparatus for implementing a wireless television system, comprising:

a selectable program source coupled to said wireless television system for providing program information;

a wireless base station coupled to said selectable program source for processing and wirelessly transmitting said program information; and a display device configured to wirelessly receive said program information and responsively display said program information in variable viewing locations, wherein said wireless base station includes an infrared transmitter and a radio-frequency transmitter for transmitting master control information for controlling said wireless television system.

18. An apparatus for implementing a wireless television system, comprising:

a selectable program source coupled to said wireless television system for providing program information;

a wireless base station coupled to said selectable program source for processing and wirelessly transmitting said program information; and a display device configured to wirelessly receive said program information and responsively display said program information in variable viewing locations, wherein said wireless base station includes a radio-frequency receiver and an infrared receiver for receiving remote control information for said wireless television system, said wireless base station thereby monitoring said control information and storing corresponding system status information into a memory device to facilitate intelligent system control interaction in said wireless television system.

19. A method for implementing a wireless television system, comprising the steps of:

providing program information from a selectable program source;

processing said program information using a wireless base station;

transmitting said program information with a wireless transmission process;

receiving said program information through said wireless transmission process; and displaying said program information in variable viewing locations using a display device, wherein a subsystem processor in said wireless base station receives and responsively processes analog video, analog audio, and digital audio-video data components of said program information to provide a combined transport stream to a wireless transmitter that responsively propagates a broadcast stream to said display device.

20. A method for implementing a wireless television system, comprising the steps of:

providing program information from a selectable program source;

processing said program information using a wireless base station;

transmitting said program information with a wireless transmission process;

receiving said program information through said wireless transmission process; and displaying said program information in variable viewing locations using a display device, wherein a switcher device chooses said program information by controlling one or more outputs of said selectable program source, said switcher being wirelessly controllable by using said display device.

21. The method of claim 20 wherein said switcher device provides visual portions of said program information to a primary television for stationary viewing, and wherein said switcher device provides aural portions of said program information to speakers for stationary listening.

22. A method for implementing a wireless television system, comprising the steps of:

providing program information from a selectable program source;

processing said program information using a wireless base station;

transmitting said program information with a wireless transmission process;

receiving said program information through said wireless transmission process; and displaying said program information in variable viewing locations using a display device, wherein said wireless base station includes a series of similar base station subsystems that each correspond to a different transmission subchannel.

23. A method for implementing a wireless television system, comprising the steps of:

providing program information from a selectable program source, said program information including analog video, analog audio, and digital audio/video data;

processing said program information using a wireless base station wherein a base station subsystem formats said program information to generate formatted video, formatted audio, and formatted data, and wherein a subsystem processor processes said formatted video to generate processed video, processes said formatted audio to generate processed audio, and processes said formatted data to generate processed data, said subsystem processor subsequently combining said processed video, said processed audio, and said processed data to responsively generate a processed stream;

transmitting said program information with a wireless transmission process;

receiving said program information through said wireless transmission process; and displaying said program information in variable viewing locations using a display device.

24. The method of claim 23 wherein said subsystem processor compresses said formatted video, compresses said formatted audio, and transcodes said formatted data.

25. The method of claim 24 wherein said subsystem processor compresses said formatted video and said formatted audio in accordance with an MPEG-2 specification, and wherein said subsystem processor transcodes said formatted data by converting a data bit rate of said formatted data to achieve an optimal compatibility with said wireless television system.

26. The method of claim 23 wherein a communications processor accesses and manipulates said processed stream to generate a transmitter-ready output stream depending upon transmission characteristics of said wireless television system.

27. The method of claim 26 wherein a transmitter accesses said transmitter-ready output stream, and responsively up-converts and modulates said transmitter-ready output stream to propagate a broadcast stream through an antenna device to said display device.

28. The method of claim 27 wherein an auxiliary base station receives said broadcast stream with a radio-frequency repeater that re-broadcasts said broadcast stream to said display device to improve broadcast signal characteristics.

29. The method of claim 28 wherein said radio-frequency repeater receives said transmitter-ready stream through a wired local-area network.

30. The method of claim 28 wherein said auxiliary base station includes a remote television connection for storing said display device and for recharging operating batteries in said display device.

31. A method for implementing a wireless television system, comprising the steps of:

providing program information from a selectable program source;

processing said program information using a wireless base station;

transmitting said program information with a wireless transmission process;

receiving said program information through said wireless transmission process;

displaying said program information in variable viewing locations using a display device, wherein said display device comprises a radio-frequency frequency subsystem that receives a broadcast stream corresponding to said program information, and responsively down-converts and demodulates said broadcast stream to generate a baseband stream;

demultiplexes said baseband streamer with an A/V decoder to generate separate information components that include demultiplexed video, demultiplexed audio, and demultiplexed data, said A/V decoder decompressing said demultiplexed video to Mnerate decompressed video, decompressing said demultiplexed audio to generate decompressed audio, and manipulating said demultiplexed data to generate manipulated data; and performing graphical user interface processing to said decompressed video with a display controller to generate display video, said display controller performing graphical user interface processing to said manipulated data to generate display data, said display video and said display data then being displayed upon a display screen of said display device, said display device being alternately implemented as a hand-held remote controller device that includes a compact display screen which reproduces said broadcast stream as generated from a picture-in-picture tuner, whereby said hand-held remote controller device is used to preview secondary program information while simultaneously viewing uninterrupted primary program information.

32. The method of claim 31 wherein said A/V decoder provides said demultiplexed audio to an amplifier and speakers for aural reproduction.

33. The method of claim 31 wherein said display device and said hand-held controller device each include a radio-frequency transmitter and an infrared transmitter for transmitting control information to said wireless base station and other components in said wireless television system.

34. The method of claim 31 wherein said display device and said hand-held controller device each include an infrared receiver for receive a broadcast stream from said wireless base station or said auxiliary base station.

35. A method for implementing a wireless television system, comprising the steps of:

providing program information from a selectable program source;

processing said program information using a wireless base station;

transmitting said program information with a wireless transmission process;

receiving said program information through said wireless transmission process; and displaying said program information in variable viewing locations using a display device, wherein said wireless base station includes an infrared transmitter and a radio-frequency transmitter for transmitting master control information to said wireless television system.

36. A method for implementing a wireless television system, comprising the steps of:

providing program information from a selectable program source;

processing said program information using a wireless base station;

transmitting said program information with a wireless transmission process;

receiving said program information through said wireless transmission process; and displaying said program information in variable viewing locations using a display device, wherein said wireless base station includes a radio-frequency receiver and an infrared receiver for receiving remote control information for said wireless television system, said wireless base station thereby monitoring said control information and storing corresponding system status information into a memory device to facilitate intelligent system control interaction in said wireless television system.

37. A wireless base station comprising:

formatting means for converting one or more program sources into formatted information;

a subsystem processor configured to process and combine said formatted information to generate a processed stream;

a communication processor configured to process said processed stream to produce a transmitter-ready stream;

a transmitter configured to receive said transmitter-ready stream and responsively transmit a broadcast stream; and means for monitoring wireless control signals and maintaining system status information to facilitate efficient system control procedures.

38. An auxiliary base station system comprising:

a stream source for providing program information from a base station; and a plurality of auxiliary base stations that a wireless display receiver constantly monitors to transparently switch to an optimal transmission signal from a corresponding one of said plurality of auxiliary base stations, said plurality of auxiliary base stations each including a remote auxiliary transmitter for broadcasting said program information to a remote display receiver.

\* \* \* \* \*